(12) United States Patent  
Huang

(10) Patent No.: US 9,116,422 B2
(45) Date of Patent: Aug. 25, 2015

(54) DISPLAY APPARATUS FOR DISPLAYING MULTIPLE IMAGES OF VIEWING ANGLES

(75) Inventor: Junejei Huang, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 402 days.

(21) Appl. No.: 13/435,584

(22) Filed: Mar. 30, 2012

(65) Prior Publication Data

US 2012/0257124 A1  Oct. 11, 2012

Related U.S. Application Data

(60) Provisional application No. 61/472,803, filed on Apr. 7, 2011.

(30) Foreign Application Priority Data

Dec. 27, 2011 (TW) .............................. 100148899 A

(51) Int. Cl.
*G03B 21/00* (2006.01)
*G02B 27/22* (2006.01)
(Continued)

(52) U.S. Cl.
CPC ............ *G03B 35/18* (2013.01); *G02B 27/2214* (2013.01); *G02B 27/2264* (2013.01); *G03B 21/10* (2013.01); *G03B 21/625* (2013.01); *G02B 26/12* (2013.01)

(58) Field of Classification Search
CPC .......... H04N 13/0459; H04N 13/0402; H04N 13/0404; H04N 13/0406; H04N 13/0409; G02B 27/225; G02B 27/2228; G02B 27/22; G02B 27/2214; G02B 27/14; G02B 27/283; G03B 35/20; G03B 35/18

USPC .......... 353/7, 8, 30, 31, 81, 94; 359/464, 465, 359/462, 452, 453, 455, 456, 460; 348/51, 348/54, 58

See application file for complete search history.

(56) References Cited

U.S. PATENT DOCUMENTS 5,765,934 A * 6/1998 Okamori et al. ................ 353/94
6,014,164 A * 1/2000 Woodgate et al. .............. 348/51
(Continued)

FOREIGN PATENT DOCUMENTS

CN  200410048984.7   2/2005
CN     201199289 Y   2/2009
(Continued)

OTHER PUBLICATIONS

Time-multiplexed color autostereoscopic display, Presented to "SPIE Symposium on Stereoscopic Displays and Applications VII", San Jose, California, Jan. 28-Feb. 2, 1996. Published in Proc. SPIE vol. 2653.

(Continued)

*Primary Examiner* — William C Dowling
*Assistant Examiner* — Ryan Howard
(74) *Attorney, Agent, or Firm* — McClure, Qualey & Rodack, LLP

(57) ABSTRACT

A display apparatus for displaying multiple images of viewing angles is disclosed. The display apparatus comprises a display screen and a projector. The projector has at least one light source module, an optical component module, a first light modulator, a second light modulator and a projection lens. The light source module generates a light beam, which is divided into a first portion light and a second portion light after passing through the optical component module. The first portion light and the second portion light are respectively received by the first light modulator and the second light modulator, and transformed into the image of the first viewing angle image and the second viewing angle respectively. Then, the image of the first viewing angle and the second viewing angle are projected to the display screen by the projection lens simultaneously.

6 Claims, 12 Drawing Sheets

(51) Int. Cl.
*G03B 35/18* (2006.01)
*G03B 21/10* (2006.01)
*G03B 21/625* (2014.01)
*G02B 26/12* (2006.01)

(56) References Cited

U.S. PATENT DOCUMENTS

| | | | |
|---|---|---|---|
| 6,304,263 | B1 | 10/2001 | Chiabrera et al. |
| 6,871,956 | B1 | 3/2005 | Cobb et al. |
| 7,150,531 | B2 * | 12/2006 | Toeppen ............... 353/7 |
| 7,241,014 | B2 * | 7/2007 | Lippey et al. ............. 353/8 |
| 7,722,189 | B2 | 5/2010 | Miles |
| 8,085,462 | B2 * | 12/2011 | Mayer et al. ............ 359/290 |
| 2007/0177262 | A1 * | 8/2007 | Maekawa et al. ......... 359/457 |
| 2007/0296920 | A1 | 12/2007 | Mezouari et al. |
| 2008/0117491 | A1 | 5/2008 | Robinson |
| 2008/0310756 | A1 | 12/2008 | Tao et al. |
| 2013/0321718 | A1 * | 12/2013 | Huang ...................... 349/5 |

FOREIGN PATENT DOCUMENTS

| | | |
|---|---|---|
| CN | 200810166723.3 | 3/2009 |
| TW | 329503 | 4/1998 |
| TW | 200844693 | 11/2008 |
| TW | 200900847 A | 1/2009 |
| TW | 200928441 | 7/2009 |
| TW | 200939738 A | 9/2009 |
| TW | 201021545 | 6/2010 |
| TW | 201044019 | 12/2010 |

OTHER PUBLICATIONS

English translation of abstract of TW 329503.
English translation of abstract of CN 200410048984.7.
English translation of abstract of CN 200810166723.3.
English translation of abstract of TW 201044019.
English translation of abstract of TW 201021545.
English translation of abstract of TW 200928441.
English translation of abstract of TW 200844693.
Taiwan Office Action dated Jan. 20, 2014.
English summary of Taiwan Office Action dated Jan. 20, 2014.
English translation of abstract of CN 201199289 Y (published Feb. 25, 2009).
English translation of abstract of TW 200939738 A (published Sep. 16, 2009).
English translation of abstract of TW 200900847 A (published Jan. 1, 2009).

* cited by examiner

DISPLAY APPARATUS FOR DISPLAYING MULTIPLE IMAGES OF VIEWING ANGLES

This application claims priority to U.S. provisional application No. 61/472,803 filed on Apr. 7, 2011, and Taiwan Patent Application No. 100148899 filed on Dec. 27, 2011, which are hereby incorporated herein by reference in its entirety.

CROSS-REFERENCES TO RELATED APPLICATIONS

Not applicable.

BACKGROUND OF THE INVENTION

1. Field of the Invention

The present invention provides a display apparatus, and more particularly, to a display apparatus for displaying multiple images of viewing angles.

2. Descriptions of the Related Art

To obtain more vivid and realistic images, corresponding displaying technologies have been developed in succession over recent years to satisfy the viewers' demands. In contrast to early-stage flat panel display mainly focuses on the improvement of the resolution and colors, while recent years the three-dimensional (3D) display apparatuses' goal is to provide the viewers with a vivid stereoscopic displaying effect.

The stereoscopic displaying effect is achieved primarily by feeding different viewing angles of an object to the left and right eyes respectively. According to the vision characteristics of human eyes, when the left and right eyes receive two images with the same image contents but different parallaxes simultaneously, the 3D image of an object with a sense of level and depth will be perceived by the viewer.

In practice, 3D images are generally appreciated either by the use of glasses or by viewing the naked eye; technical developments over recent years have focused on the latter. Furthermore, when viewed with the naked eye, the images could be time multiplex or spatial multiplex method. The following gives a brief introduction of the two types.

FIG. 1 is a schematic view of a conventional projection-type stereoscopic display apparatus 1 adopting a spatial multiplex mode. As shown, the stereoscopic display apparatus 1 that adopts the spatial multiplex mode comprises a plurality of strip-like light sources 11 disposed adjacent to each other, a Fresnel lens 12 and a liquid crystal display (LCD) panel 13. The strip-like light sources 11 each provide a light beam to the Fresnel lens 12 sequentially. The light beam is focused by the Fresnel lens 12 in a planar manner and then imaged onto the LCD panel 13. After imaging onto the LCD panel 13 the image is projected onto a corresponding viewing zone. However, because one light source can only provide one viewing angle in the aforesaid stereoscopic image displaying technology adopting the spatial multiplex mode, the number of viewing angles that can be provided is limited to the capacity of the projector, and the disposition and arrangement of the light sources within the projector. Consequently, with the limitation of the light source, the resolution of the projector is hard to improve.

FIG. 2 is a schematic view of another conventional projection-type stereoscopic display apparatus 2 adopting the time multiplex mode. As shown, the display apparatus 2 comprises a light source 21, a polarizer 23, a rotary polygonal mirror 25, a panel 27 and a plurality of optical components 29. The light source 21 generates a light beam that is polarized by the polarizer 23 and then reflected by the rotary polygonal mirror 25 onto the panel 27 for imaging, which produces a scanning-like effect. Then, the optical components 29 project the images of different viewing angles to the different viewing zones according to a time sequence. More specifically, the light source 21 generates a first viewing angle image, a second viewing angle image, a third viewing angle image and a fourth viewing angle image onto adjacent different viewing zones of the panel 27 in different sequences. However, the projection-type stereoscopic display apparatus requires a rotary polygonal mirror 25 to realize the above said results. In addition, the rotary polygonal mirror 25 mostly functions mechanically, so considerable noises are produced due to the friction. Moreover, with the increasing demand of improved resolution, more viewing angles are to be provided, thereby, the rotation speed of the rotary polygonal mirror 25 must be increased, making the aforesaid shortcoming more prominent.

Therefore, there are still shortcomings and problems to be overcome either for the spatial or time multiplex method. Accordingly, it is highly desirable in the art to provide a stereoscopic display apparatus with advantages such as low costs, simplified optical configurations and a high resolution without the above said shortcomings and problems.

SUMMARY OF THE INVENTION

The present invention provides a display apparatus for displaying multiple images of viewing angles. The display apparatus comprises a display screen and a projector, and can image at least two images of viewing angles onto at least two adjacent viewing zones respectively so that a stereoscopic image is provided to the viewer.

The projector has at least one light source module, an optical component module, a first light modulator, a second light modulator and a projection lens. The light source module can generate a light beam, which is divided into a first portion light and a second portion light after passing through the optical component module. The first portion light and the second portion light are respectively received by the first light modulator and the second light modulator, and are transformed into the image of the first viewing angle and the image of the second viewing angle respectively. Then, the image of the first viewing angle and the image of the second of the viewing angle are projected to the display screen by the projection lens simultaneously.

The display screen projects the image of the first viewing angle and the image of the second viewing angle to the first viewing zone and second viewing zone by means of the first portion light and the second portion light respectively.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. The present invention provides a display apparatus. It should be appreciated that the description of these embodiments is only for the purpose of illustration rather than to limit the present invention. Meanwhile, in the following embodiments and the attached drawings, elements unrelated to the present invention are omitted from depiction; and the dimensional relationships among the individual elements in the attached drawings are illustrated only for the ease of understanding, but not to limit the actual scale.

The present invention provides a display apparatus for displaying multiple images of the viewing angles. The display apparatus comprises a display screen and a projector. The projector projects two images of different viewing angles to the display screen so that a stereoscopic image is provided to the viewer.

For simplicity of the attached drawings and for ease of understanding, only a part of the light beams are shown in the specification; however, the overall operations of the present invention can be readily appreciated and put into use by people skilled in the art.

Figure 1:
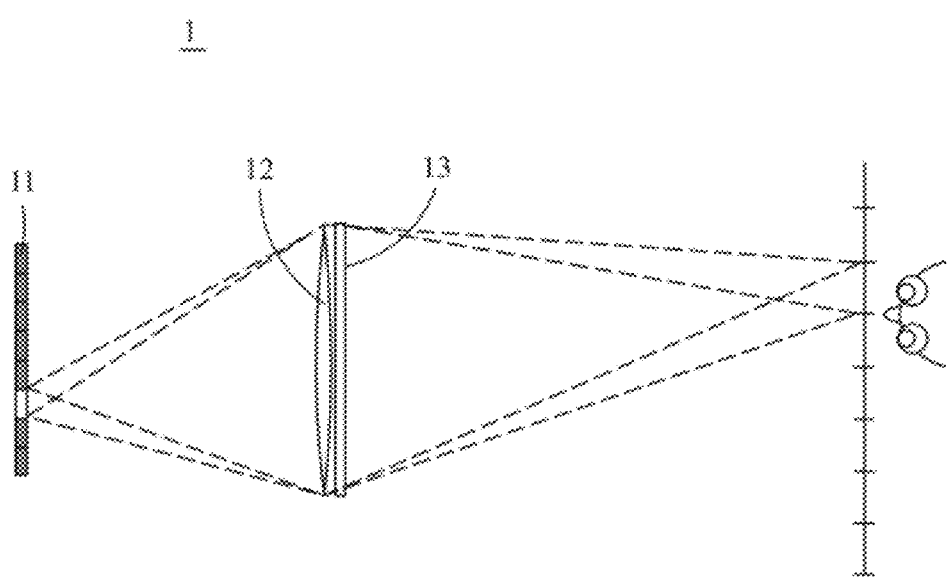
FIG. 1 is a schematic view of a conventional projection-type stereoscopic display apparatus adopting a spatial multiplex mode.
Figure 2:
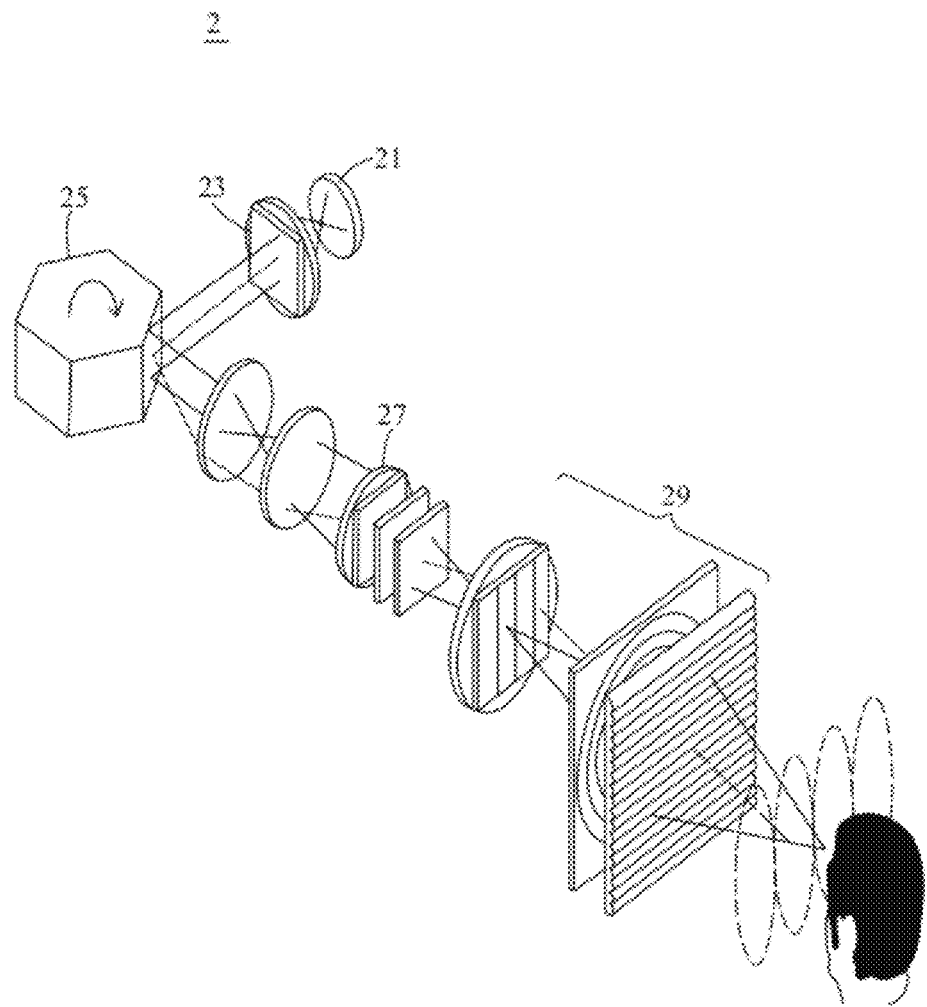
FIG. 2 is a schematic view of a conventional projection-type stereoscopic display apparatus adopting the time multiplex mode.
Figure 3A:
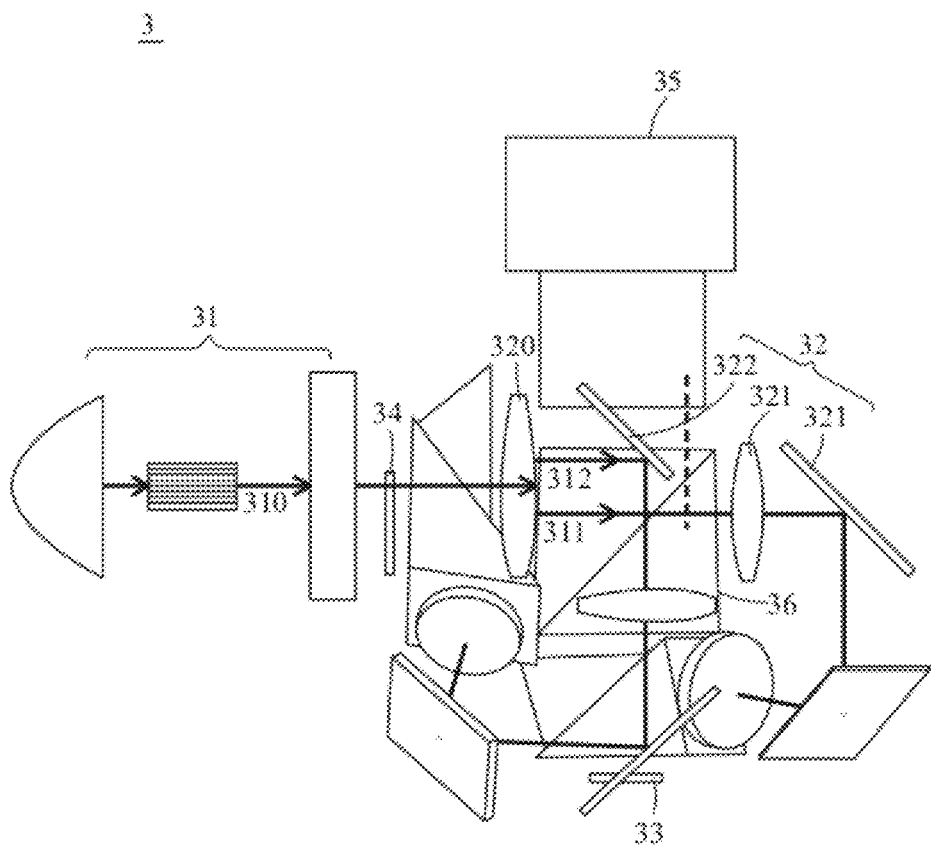
FIG. 3A is a schematic internal view of a projector according to a first embodiment of the present invention.
Figure 3B:
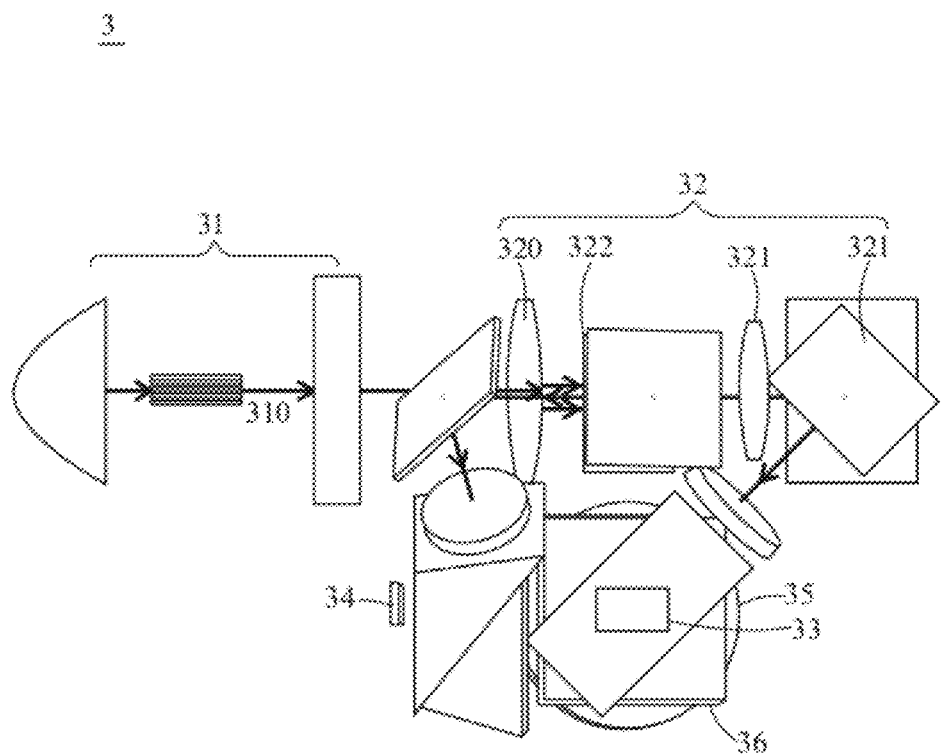
FIG. 3B is a schematic internal view of the projector of FIG. 3A at another view angle.
Figure 3C:
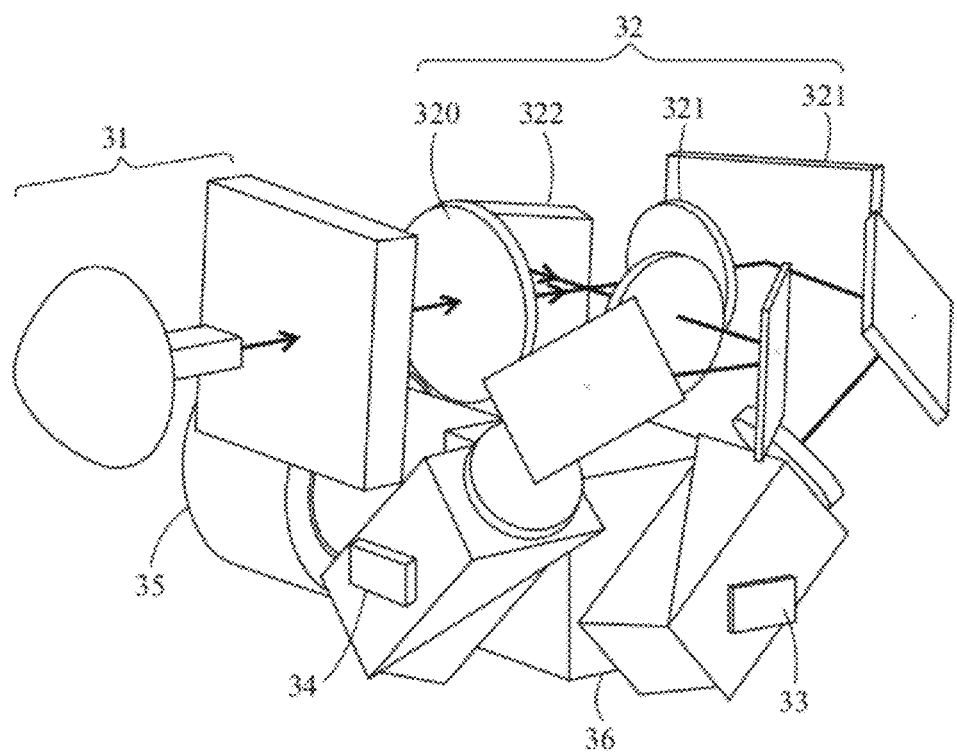
FIG. 3C is a schematic internal view of the projector of FIG. 3A at a further view angle.

FIGS. 3A to 3C are schematic internal views of a projector 3 according to the first embodiment of the present invention at different view angles. The projector 3 has a light source module 31, an optical component module 32, a first light modulator 33, a second light modulator 34, a projection lens 35 and a light combining component 36.

In this embodiment, only one light source module is illustrated as an example although the present invention is not limited to this. The light source module 31 can generate a light beam 310 and uniformize the light beam 310 by means of a light converging rod. The optical component module 32 comprises a light converging module 320, a first light path module 321 and a second light path module 322. The light beam 310 from an outlet of the light converging rod is then converged by the light converging module 320 (the light converging module 320 in this embodiment is a lens) for imaging purposes. In FIG. 3A, a broken line is present to show the primitive imaging position of the light beam after passing through the light converging module 320. After being transmitted and reflected by the lenses and reflectors of the first light path module 321 and the second light path module 322, the light beam 310 is divided into a first portion light 311 and a second portion light 312 (only primary light beams are shown) which further travel forward along different light paths respectively.

In detail, the first light path module 321 comprises a plurality of first reflectors for reflecting and guiding the first portion light 311 to the first light modulator 33; and similarly, the second light path module 322 also comprises a plurality of second reflectors for reflecting and guiding the second portion light 312 to the second light modulator 34. In this embodiment, the reflectors are disposed at an angle of 45 degrees with respect to the incident first portion light 311 and the incident second portion light 312, so the first portion light 311 and the second portion light 312 are incident on and reflected by the reflectors at an angle of 45 degrees reflectively; however, the present invention is not limited to this angle. Here, the first light path module 321 generally refers to the optical components that the first portion light 311 passes through after exiting from the optical component module 32 but before arriving at the first light modulator 33. Similarly, the second light path module 322 generally refers to the optical components that the second portion light 312 passes through after exiting from the optical component module 32 but before arriving at the second light modulator 34. Therefore, the types, numbers and arrangements of the optical components described herein can be adjusted depending on the internal volume of the projector 3 and the different arrangements of the projection lens 35, so the number of optical components of the present invention is not limited to this embodiment. Furthermore, for the convenience of understanding the drawings, only some components of the light converging module 320, the first light path module 321 and the second light path module 322 are denoted in the drawings.

The first portion light 311 and the second portion light 312 are transferred by corresponding total internal reflection prisms (TIR prisms) respectively to be received by the first light modulator 33 and the second light modulator 34, and are then transformed into an image of the first viewing angle and the second image of the viewing angle respectively before being projected by the corresponding total internal reflection prisms again. It shall be appreciated that because the light beam 310 will be divided into the first portion light 311 and the second portion light 312 subsequently for the first light modulator 33 and the second light modulator 34, the area of the light beam 310 after being uniformized via the light converging rod is exactly equal to the sum of the imaging areas of the first light modulator 33 and the second light modulator 34. Taking this embodiment as an example, if an aspect ratio of the light beam 310 after being uniformized is 32:9, then an aspect of each of the light modulators' imaging areas is 16:9. Thus, the light modulators can completely receive and transform the respective viewing angle images. In this embodiment, the first light modulator 33 and the second light modulator 34 are both digital micro mirror devices (DMD); however, the light modulators may also be liquid crystal display (LCD) devices in other embodiments.

Figure 4:
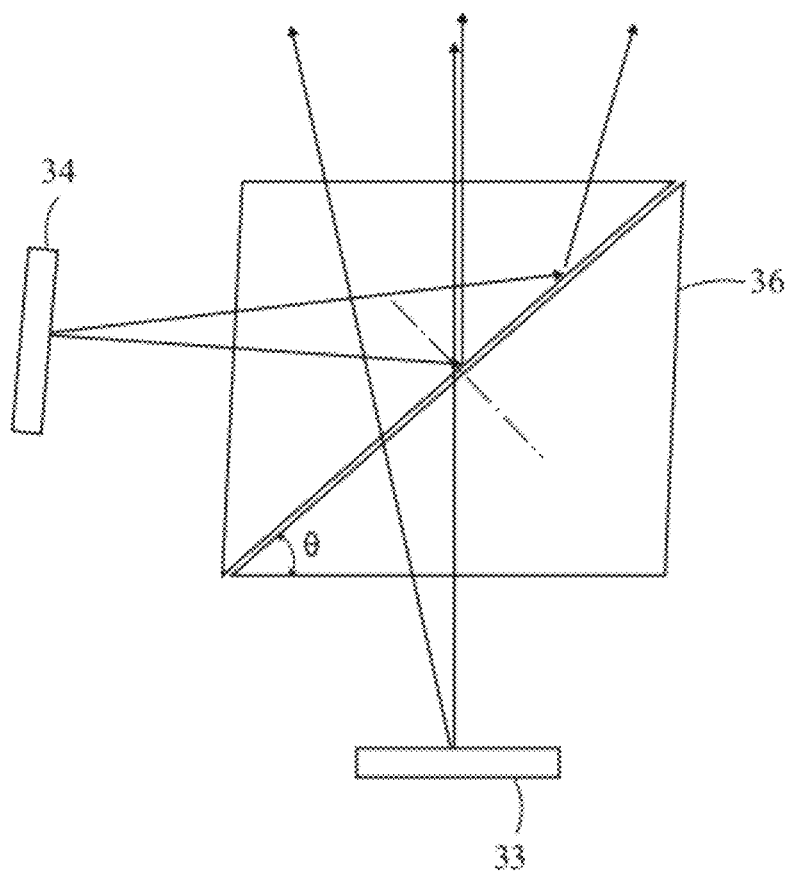
FIG. 4 is a schematic view of a part of light paths inside the projector according to the first embodiment of the present invention.

After the first portion light 311 and the second portion light 312 are transformed into the image of the first viewing angle and the image of the second of the viewing angle by the first light modulator 33 and the second light modulator 34 respectively, the image of the first viewing angle and the image of the second viewing angle are projected by the total internal reflection prisms. Then, the image of the first viewing angle and the image of the second viewing angle are received by the light combining component 36 from different directions and transformed into the same direction to be provided to the projection lens 35. More specifically, FIG. 4 illustrates a schematic view of a part of light paths inside the projector 3 according to the first embodiment of the present invention. In the projector 3, the light combining component 36 is used to transmit the view angles images transformed by the two light modulators 33, 34 to the projection lens 35. Finally, the projection lens 35 projects the two viewing angle images to the display screen simultaneously as detailed hereinafter.

In this embodiment, the light combining component 36 is a total internal reflection cube, for instance, a total internal reflection prism (TIR prism). The light combining component 36 may be designed to have different included angles θ depending on the different materials. For example, the angle is preferably 41.2 degrees when BK7 glass is used, and is preferably 35.6 degrees when SF-1 is used. Furthermore, although only two light modulators in combination with one light combining component are illustrated in this embodiment, people skilled in the art may also proceed with other implementations in which more than two light modulators are used in combination with one light combining component. In other words, this embodiment is only intended to illustrate but not to limit the present invention.

Figure 5A:
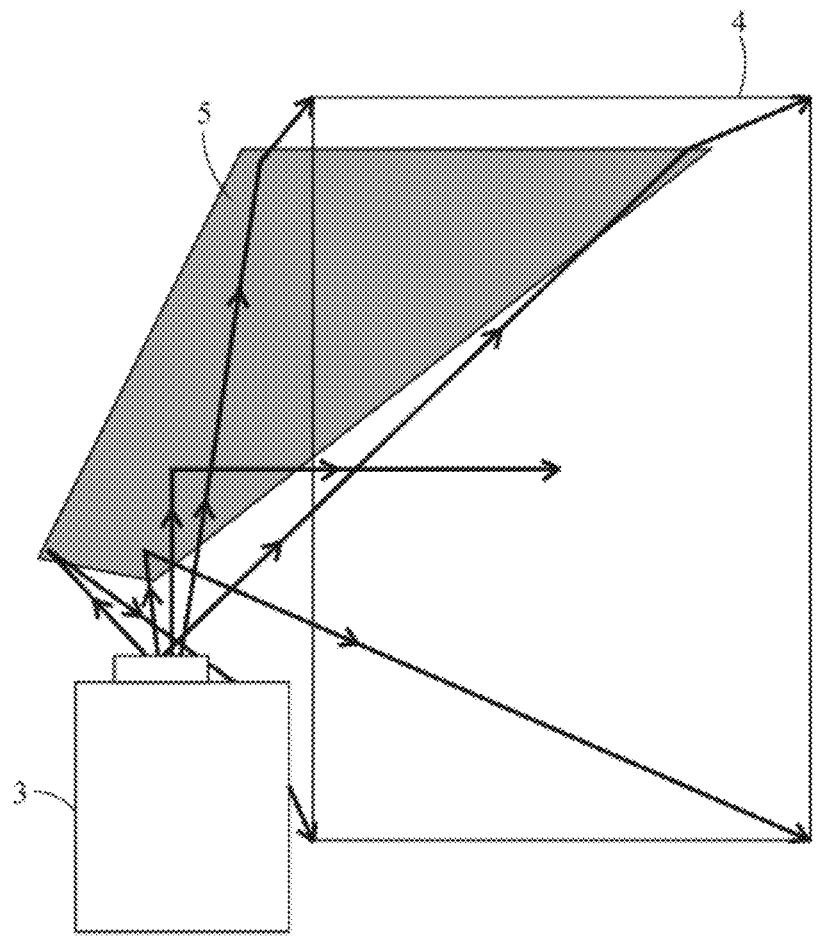
FIG. 5A is a schematic view of the projector in combination with a display screen according to the first embodiment of the present invention.
Figure 5B:
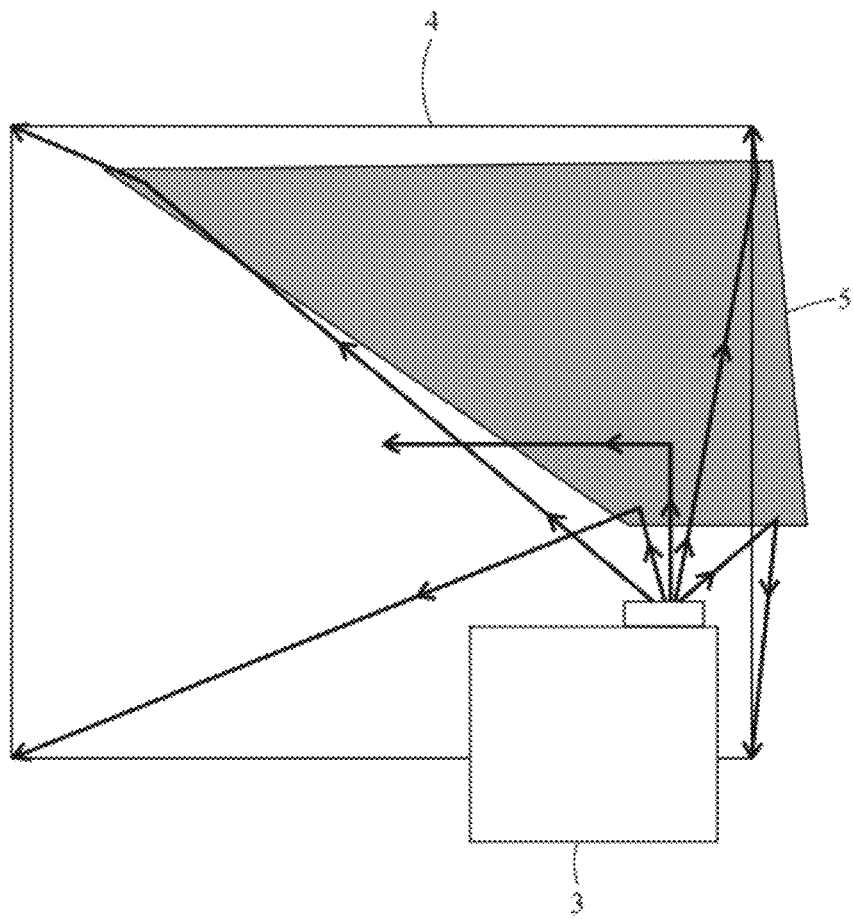
FIG. 5B is a schematic view of the projector in combination with the display screen at another view angle according to the first embodiment of the present invention.

FIGS. 5A and 5B show schematic views of the projector 3 in combination with a display screen 4 at different view angles according to the first embodiment of the present invention. The display apparatus comprises the projector 3, the display screen 4 and a reflecting surface 5. The projector 3 is of a rear-projection type, so an image can be displayed on the display screen 4 by means of the reflecting surface 5.

Figure 6:
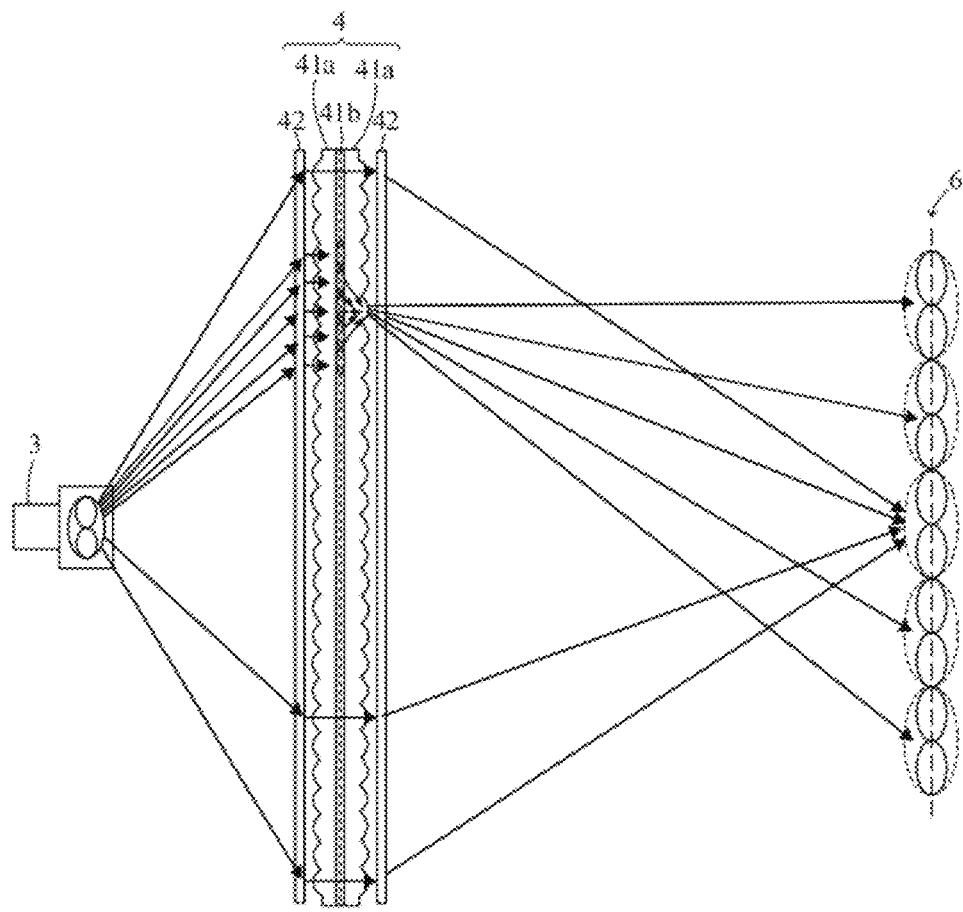
FIG. 6 is a schematic view illustrating how a display apparatus using the projector of the first embodiment displays an image according to the present invention.

FIG. 6 illustrates a schematic view of how a display apparatus using the projector 3 of the first embodiment displays an image. As described above, the display apparatus comprises the projector 3, the display screen 4 and a reflecting surface 5. The display screen 4 comprises a double lenticular lens. The double lenticular lens has two lenticular lens sheets 41a and an all-direction diffuser 41b disposed therebetween. An outer plate 42 is disposed at an outer side of each of the two lenticular lens sheets 41a respectively. By means of the all-direction diffuser 41b embodying the multi-direction diffusing function, the image of the first viewing angle image and the image of the second viewing angle from the projector 3 can be projected to a reference plane 6.

Furthermore, other implementations of the display screen are also possible in the present invention; for example, the display screen may be replaced with a Fresnel lens and a vertical diffuser. After entering such a display screen, a plurality of images of viewing angles is diffused in a vertical direction by the vertical diffuser. If the first embodiment is taken as an example, the light portions are the first portion light and the second portion light. Then, the portion lights are focused to adjacent viewing zones by the Fresnel lens to form the first view angle image and the second view angle image respectively. In other words, the viewer can watch different viewing angle images on the reference plane.

It shall be particularly appreciated that although only one light source is used in combination with the two light modulators in the first embodiment and only two viewing angle images can be displayed on the display screen, the projector may comprise a plurality of light sources used in combination with two light modulators in other embodiments. In the latter case, the light sources generate light beams sequentially to achieve the purpose of generating multiple images of the viewing angles in a time multiplex mode. Furthermore, multiple images of the viewing angles may also be obtained by disposing a plurality of projectors inside the display apparatus. In other words, every additional projector will multiple the number of the images of the viewing angles, and in this way, the purpose of generating multiple images of viewing angles described above may also be achieved.

Figure 7:
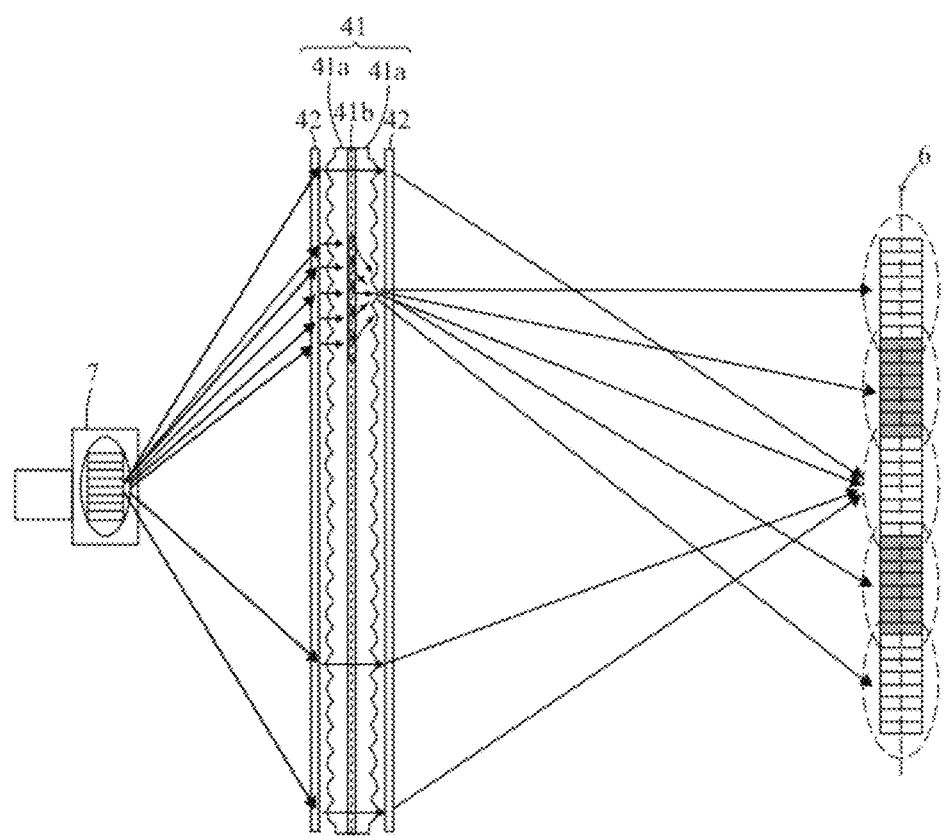
FIG. 7 is a schematic view illustrating an embodiment of the display apparatus, using another aspect of the projector, of the present invention.

In detail, with reference to FIG. 7, there is a schematic view illustrating a different perspective of a display apparatus of the present invention unlike that of the first embodiment. FIG. 7 differs from FIG. 6 in that a light source module in the display apparatus 7 shown in FIG. 7 has four light sources, which each of the light sources generates a light beam sequentially. After passing through the two light modulators and being imaged by the display screen 4, the four light beams generated sequentially will generate images of eight viewing angles on the reference plane 6 which are imaged on respective view zones sequentially. In other words, the viewer can receive eight images of viewing angles on the reference plane. Therefore, people of ordinary skill in the art can achieve the purpose of multiplying view angles by increasing the number of light sources so that both the number and density of images of viewing angles can be increased to improve the imaging quality of images.

Figure 8:
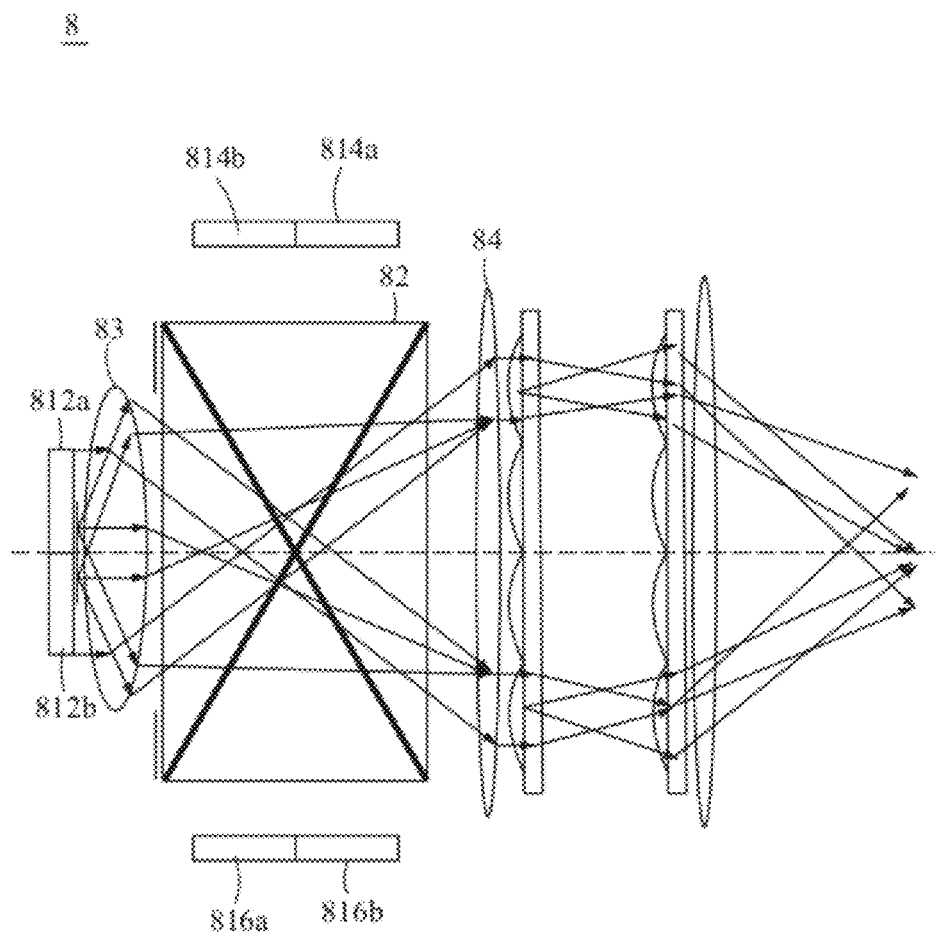
FIG. 8 is a schematic view of a projector with two sets of light source modules according to the present invention.

As shown in FIG. 8, there is a schematic view of a projector 8 with two light source modules according to the present invention. Apart from the two light source modules, the projector 8 further comprises a light combining component 82, a first lens module 83, a second lens module 84 and other necessary optical components (not shown).

One of the two light source modules comprises light sources 812a, 814a and 816a and the other one comprises light sources 812b, 814b and 816b. In this embodiment, the two light source modules each have three light emitting diode (LED) light sources. In detail, the light sources 812a, 814a and 816a generate a first color light, a second color light and a third color light respectively in a first timing sequence to form a first light beam; and similarly, the light sources 812b, 814b and 816b generate a first color light, a second color light and a third color light respectively in a second timing sequence to form a second light beam. Furthermore, the first color light, the second color light and the third color light are a red light, a green light and a blue light respectively in this embodiment, but the present invention is not limited to these lights. It shall be appreciated that for the clarity of the attached drawings and simplicity of the description, only a light path of a single light source is shown therein; however, light paths of the other light sources can be readily appreciated by people skilled in the art.

Therefore, the first light beam and the second light beam can cooperate with the two light modulators in turn to generate a first viewing angle image, a second viewing angle image, a third viewing angle image and a fourth viewing angle image. If three light source modules are used instead in combination with the two light modulators, then six viewing angle images can be generated. Therefore, by adjusting the number of light sources and number of light modulators, more corresponding viewing angle images can be generated.

In this embodiment, an X-cube is used as the light combining component 82 to combine the red light, the green light and the blue light. However, in other embodiments, the light combining component may also be of some other light combining apparatus such as an X-plate or a dichroic mirror, and the present invention is not limited to what is listed above.

Figure 9:
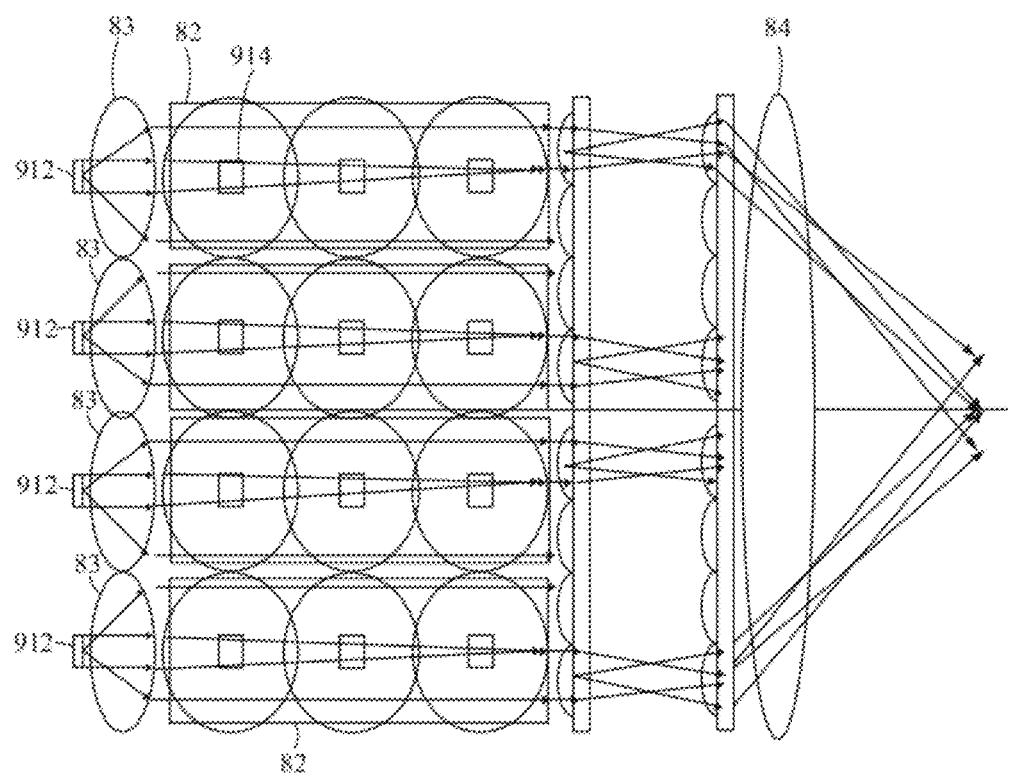
FIG. 9 is a schematic view of a projector with light source modules arranged in the form of an array according to the present invention.

FIG. 9 illustrates the schematic view of a projector with light source modules arranged in the form of an array according to the present invention. FIG. 9 differs from FIG. 8 mainly in that a light source module in FIG. 9 has twelve light sources. The twelve light sources are divided into three groups of different color light sources 912 and 914 (only two groups of light sources are shown because of the viewing angle), and are arranged in the form of an array inside the projector 8. Similarly, light from the three groups of different color light sources 912 and 914 (one is not shown) are also combined in turn by the light combining component 82. Light modulators are used in combination to generate a plurality of viewing angles images. Furthermore, the components and related imaging mechanisms in this embodiment which are the same as those described in the aforesaid descriptions will not be further described again herein.

According to the above descriptions, the present invention utilizes at least one light source in combination with two light modulators and can increase the number of view angles by adjusting the number of light sources. With this arrangement, the volume of the display apparatus can be reduced effectively, the design of light paths could be simplified and lower the production cost.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A display apparatus for displaying multiple images of viewing angles, comprising:
   a display screen; and
   a projector, having:
   at least one light source module, generating a light beam, the at least one light source module comprises a plurality of light source modules for generating the light beam sequentially;
   an optical component module, dividing the light beam into a first portion light and a second portion light;
   a first light modulator, receiving the first portion light and transforming the first portion light into a first view angle image;
   a second light modulator, receiving the second portion light and transforming the second portion light into a second view angle image;
   a projection lens, projecting the first view angle image and the second view angle image to the display screen simultaneously, and
   a light combining component, receiving and providing the first view angle image and the second view angle image to the projection lens;
   wherein the light combining component is a total internal reflection cube, and the display screen images the first view angle image and the second view angle image to a first viewing zone and second viewing zone by means of the first portion light and the second portion light respectively.

2. The display apparatus as claimed in claim 1, wherein the optical component module comprises a light converging module, a first light path module and a second light path module, the light beam is divided into the first portion light and the second portion light after passing through the light converging module, and the first portion light and the second portion light are transmitted to the first light path module and the second light path module respectively.

3. The display apparatus as claimed in claim 1, wherein the display screen comprises a Fresnel lens.

4. The display apparatus as claimed in claim 3, wherein the display screen further comprises a vertical diffuser to diffuse the first portion light and the second portion light in a vertical direction.

5. The display apparatus as claimed in claim 1, wherein the light modulators are digital micro-mirror devices or liquid crystal devices.

6. The display apparatus as claimed in claim 1, wherein the projector is a rear projector.

* * * * *